Sept. 24, 1929.   J. K. KUYLENSTIERNA   1,728,999
ROLL OR BALL BEARINGS
Filed Jan. 15, 1926
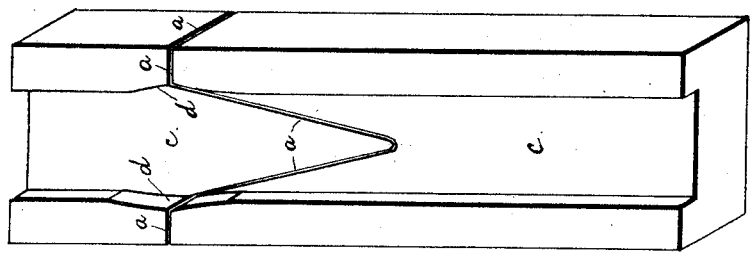
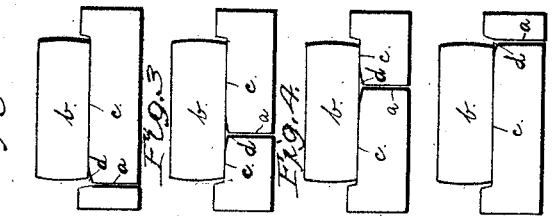
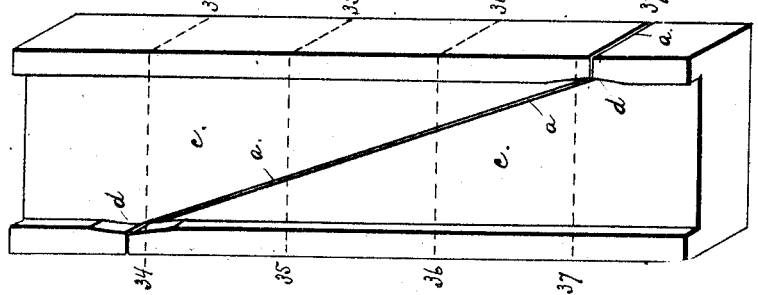

Patented Sept. 24, 1929

1,728,999

UNITED STATES PATENT OFFICE

JOHAN KARL KUYLENSTIERNA, OF STOCKHOLM, SWEDEN

ROLL OR BALL BEARINGS

Application filed January 15, 1926. Serial No. 81,539.

The need of roll- or ball bearings that may be taken apart in halves has long been very much felt, but the difficulty in making such bearings where the balls or the rolls do not become injured when passing under load over the joints and vice versa has resulted in that such bearings which are fully satisfactory have not yet been made.

According to this invention, said difficulty is eliminated owing to that the balls or the rolls during the working do not touch the joints of the running paths in spite of the balls or rolls while running round the running paths always being supported by same. The principle is that the joints whether they go forwards and backwards or only in the one direction cross the running paths at sharp angles and that the edges of the joints of the running paths are in a rounded form sunk or ground off, so that the body of the balls or rolls is separated from the body of the running paths at a sharp angle so that these can not touch each other. The other surfaces of the running paths thereby give the rolling members sufficient support at the joints. The depression that is thus caused may be made uniform or only follow the joint. One embodiment therefore may be thought obtained by changing the profiles between angle shaped running paths where there is a side thrust into arc-shaped running paths where there is a middle thrust, whereby one lets the joints pass between the thrust points. This is when balls are in question. In the accompanying drawings are shown several embodiments of the invention. To make it more clear, the joints are drawn on plane running paths instead of rounded as they ought to be.

In the accompanying drawing

Fig. 1 is a fragmentary perspective view of a bearing ring constructed in accordance with the invention.

Figs. 2, 3, 4 and 5 are detail sectional views on the lines 2—2; 3—3; 4—4; and 5—5 of Fig. 1.

Fig. 6 is a view similar to Fig. 1 showing a modification of the ring.

Referring to the drawing in detail, and particularly to Figs. 1–5, the bearing ring $c$ is shown as divided axially across the path for the rolling elements $b$ by a substantially straight and oblique cut or slit $a$. The body of the ring is provided with lateral guide flanges for the rolling elements which are also interrupted by the dividing slit $a$.

The material of the ring is cut away at the point of division or slit $a$ along that portion of the latter which divides the path of the rolling element $b$ as indicated at $d$ so as to prevent said rolling members in passing over the joint defined by the meeting ends of the bearing ring from contacting the corners of the slit.

The surfaces of the lateral guide flanges of the ring which lie substantially perpendicular to the rolling path of the ring are cut away as at $d$ to provide recesses or notches which prevent contact of the rolling elements $b$ with the corners defined by the slit in the ring.

The modification of the invention as shown in Fig. 6 is similar in all respects to Fig. 1 except that the line of division or slit $a$ instead of extending straight is in the form of a V, the corners of the slit at the rolling path and at the lateral guide flanges being cut away or recessed the same as in Fig. 1.

As mentioned above, joints at a sharp angle may be made in very many different ways. They may be running forwards and backwards, they may be at a continued sharp angle that joins the running path, they may be straight or curved and cut the material in axial as well as radial direction but all have that in common that they cut the running path at a sharp angle and that where the joint begins at the edge of the running path the material is always drawn in, so that the running path there is widened whereas where the joint passes the middle of the running path the material is sunk and the rolling members are supported by the sides of the running path. A characteristic is too that the materials of the rolling members and the running path are separated at the joints at a sharp angle in relation to each other.

Having now described my invention, what

I claim as new and desire to secure by Letters Patent is:

In a roller bearing, a ring divided axially across its rolling path and including lateral guide flanges for the rolling elements, the material of the ring being cut away at the point of division whereby the rolling elements in passing thereover are prevented from contacting the corners of the division, said guide flanges being also divided and notched at the points of division, the notches forming continuations of the cut away points of division of the rolling path.

In witness whereof, I have hereunto signed my name.

JOHAN KARL KUYLENSTIERNA.